Oct. 23, 1923.
R. E. PELTERIE
1,471,860
INTERNAL COMBUSTION AND FLUID PRESSURE ENGINE
Filed Feb. 14, 1919     5 Sheets-Sheet 1
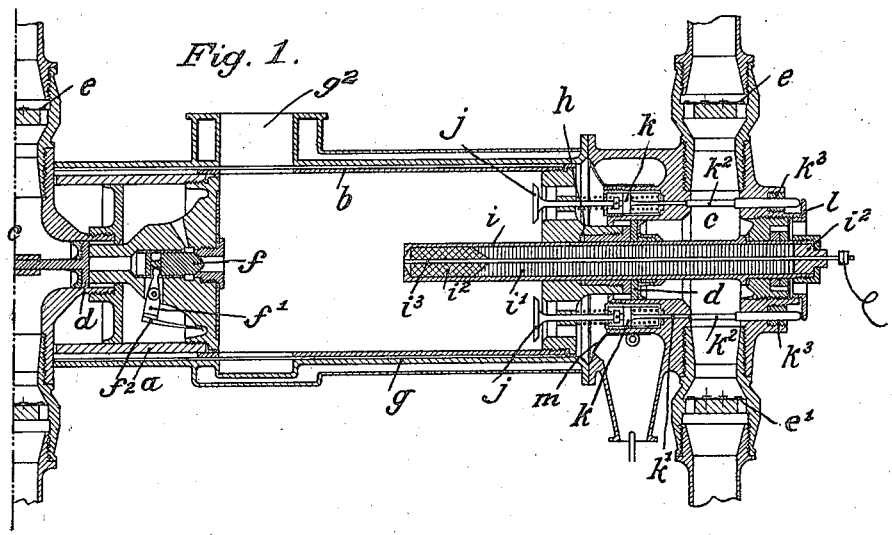
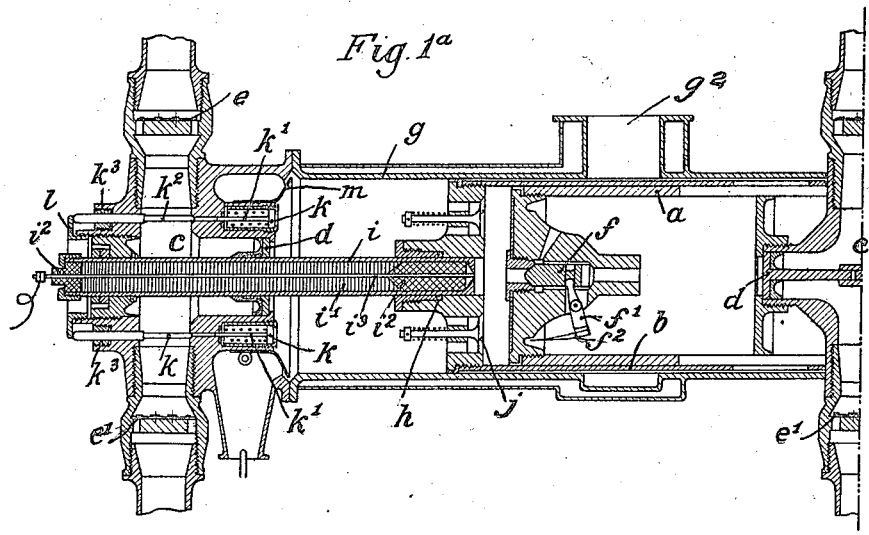
Inventor:
Robert Esnault Pelterie
By Attys

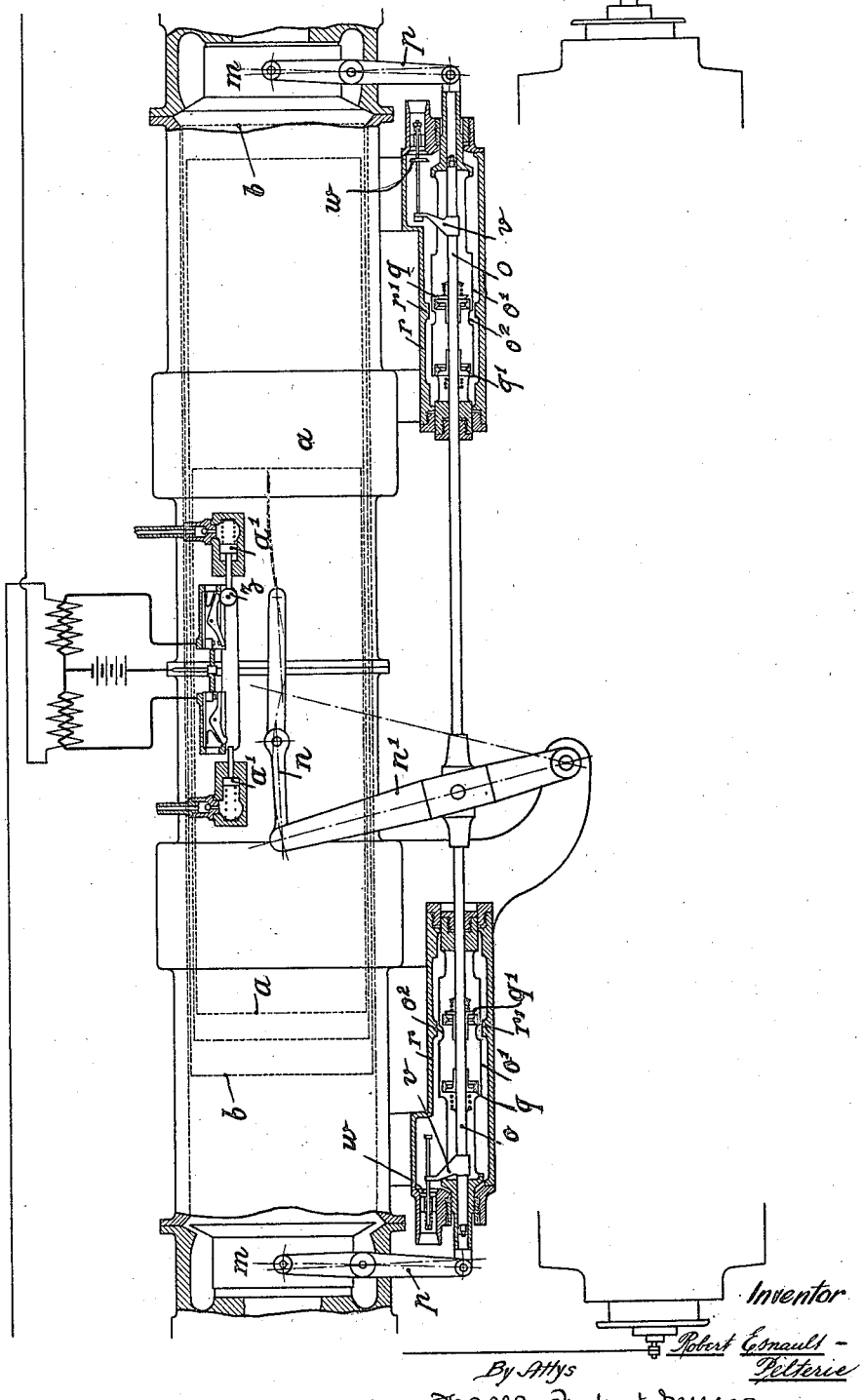

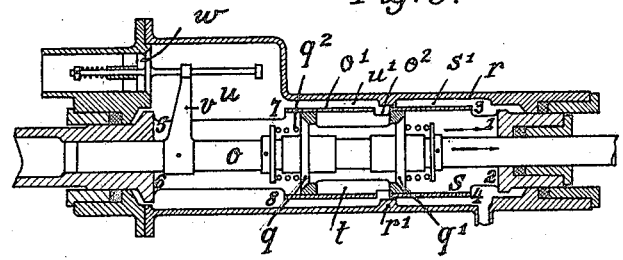
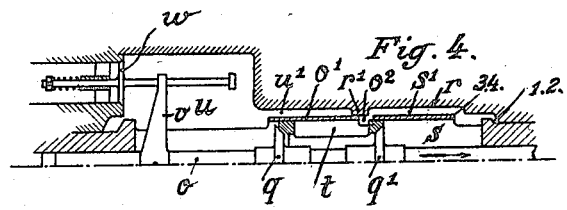
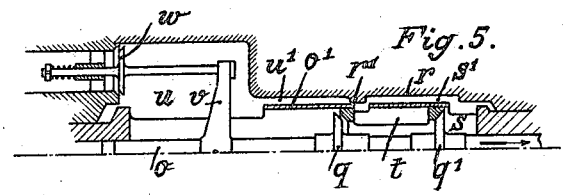
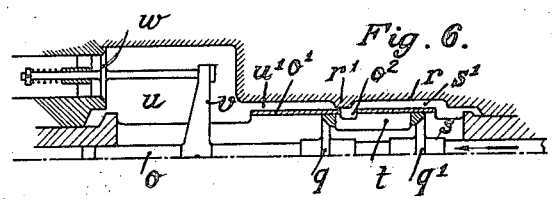
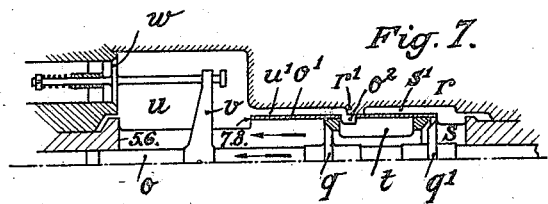

Oct. 23, 1923.

R. E. PELTERIE 1,471,860

INTERNAL COMBUSTION AND FLUID PRESSURE ENGINE

Filed Feb. 14, 1919    5 Sheets-Sheet 4

Inventor:
Robert Esnault-Pelterie
By Attys.
Fraser, Durk & Myers

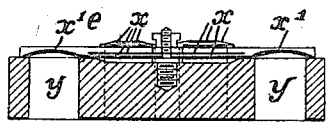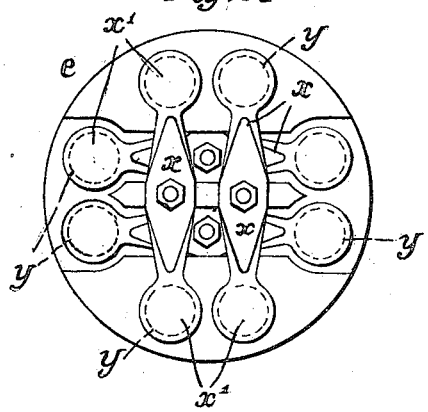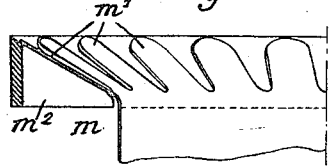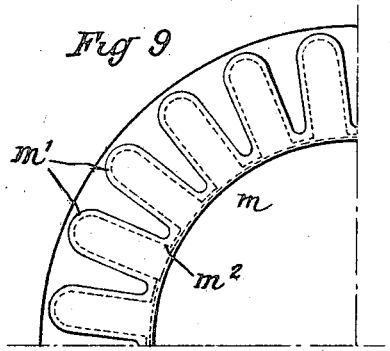

Patented Oct. 23, 1923.

1,471,860

UNITED STATES PATENT OFFICE.

ROBERT ESNAULT PELTERIE, OF PARIS, FRANCE.

INTERNAL-COMBUSTION AND FLUID-PRESSURE ENGINE.

Application filed February 14, 1919. Serial No. 277,115.

*To all whom it may concern:*

Be it known that I, ROBERT ESNAULT PELTERIE, a citizen of the Republic of France, residing in 43 Boulevard Lannes, Paris, France, have invented certain new and useful Improvements in Internal-Combustion and Fluid-Pressure Engines, of which the following is a specification.

The construction which forms the subject matter of the present application is an improvement on the structure disclosed in my Patent No. 1,459,019, for motor systems.

In the co-pending application, I describe a construction comprising a fixed cylinder, a movable cylinder located in the fixed cylinder, and a movable piston located in the movable cylinder, the actuation of the moving parts being obtained by exploding a charge between the movable cylinder and the piston, and the movements of the parts being limited by springs secured to each end of the fixed cylinders, and the energy of the motor being received by the pistons of the hydraulic pumps. In my present construction, instead of limiting the movement of the movable cylinders by springs, I provide chambers or cavities containing a compressible liquid, oil for example, and I utilize them as shock absorbers and limiting elements to receive and transmit the energy developed by the motor.

My present invention further comprises various improvements over the structure disclosed in my copending application, resulting in a simplification thereof, as will appear from the following description:

In the drawings accompanying this specification, one embodiment of my construction is shown for the purpose of illustration only, and the illustration is not intended as a limitation of the invention.

Figure 1 shows a right hand section of the explosion cylinders.

Fig. 1ᵃ shows a vertical section, similar to that shown in Figure 1, and showing the opposite end of the cylinders, Figure 1 and Figure 1ᵃ showing the complete cylinder construction.

Fig. 2 is a top elevation of the explosion cylinders, partly in section and partly fragmentary.

Fig. 3 represents a detailed view of the operating mechanism of the valve gearing partly in section.

Fig. 4 shows a view similar to that shown in Figure 3, with the operating parts in different relative positions.

Figs. 5, 6 and 7 show views similar to Figure 4, with the operating parts in different relative positions.

Fig. 9 is a fragmentary plan view of an inlet valve to assure the supply of fresh gases to the motor.

Fig. 10 is an end elevation of the valve shown in Figure 9.

Fig. 11 is a plan view of an eduction valve for the hydraulic pump, the admission valve being in all respects similar thereto, and Fig. 12 is a diametrical section of Figure 11.

Figure 8:
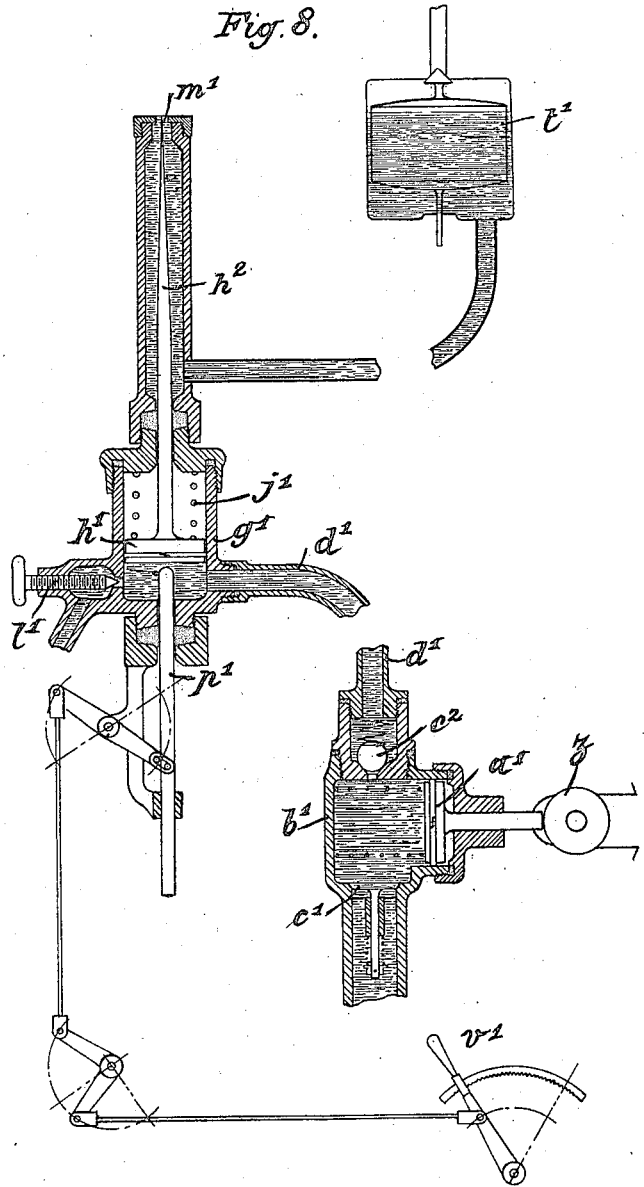
Fig. 8 is an illustration of an atomizer of one of the carburetors, and of the automatic and manual systems to regulate the motor.

Referring to the drawings, a stationary cylinder is shown at $g$. A movable cylinder $b$ is located in this stationary cylinder, and, in turn, encloses a movable piston $a$, which is free to move in the movable cylinder $b$. The relative movement of the cylinder $b$ and the piston $a$ is secured by exploding a charge between their adjacent faces first at one end of the motor and then at the opposite end, after which the products of combustion escape in each instance at the appropriate exhaust orifice $g^2$. The fixed cylinder $g$ is provided, at its opposite ends, with cavities, or chambers $c$, adapted to contain a compressible liquid, to cushion the movable cylinder $b$ at the end of its stroke, and to serve as a medium for transmitting the power generated to suitable hydraulic elements. To this end, each cavity $c$ is closed at one side by a movable piece, which may comprise a very light piston $d$, and is provided with one or more inlet and outlet valves, the inlet or admission valve $e'$ serving to admit sufficient liquid to take the place of that expelled, and the outlet or eduction valve $e$ serving to permit the expulsion of the liquid from the chamber $c$ at the proper moment.

In order to insure against damage to the apparatus, a safety valve $f$ is provided, on each face of piston $a$, the safety valve serving to close an opening which provides a passageway for the escape of the burned gases of the explosion when the movable parts exceed their limit of normal stroke, thereby tending to produce an abnormal pressure in one of the explosion chambers. This safety valve comprises a slide member $f$, one face of which serves as a valve, and a pivoted member $f'$, one end of the pivoted member engaging the member $f$, and serving to normally maintain it so as to close the escape opening in the end of the cylinder $a$. A spring $f^2$, secured to the other end of the pivoted member $f'$, serves to maintain the valve in closed position. The pivoted member $f'$ is also suitably counter-weighted so that the very great acceleration to which the piston $a$ is subjected, and consequently the valve $f$ carried thereby, may not maintain the valve closed with a force exceeding that exerted by the spring $f^2$. The spring $f^2$ is preferably so located as to lie parallel with the direction of motion of the moving parts in order that the above mentioned accelerations may not cause it to bend under its own mass and disturb its action.

The motor operates normally with self-ignition. Nevertheless, it is necessary to assure electrically the starting of the explosion of the gases between the faces of the cylinder $b$ and the piston $a$, and to this end, ignition plugs of special construction, as shown in the drawings, are provided. These plugs are shown in Figures 1 and $1^a$, and are secured to each end of the fixed casing $g$, as has already been indicated. They consist, in general, of members comprising a metal jacket or casing $i$, located on the axis of the motor, and fixedly connected to the fixed cylinder $g$, within which insulating material $i^1$, surrounding a metal conducting rod $i^3$ is compressed between plugs of hard insulating material $i^2$ such as porcelain, steatite, or the like. The plugs project through suitable openings in the movable cylinder $b$. The requisite sparking is obtained by connecting the jacket $i$ and rod $i^3$ with the terminals of a source of electromotive force, the spark jumping from the end of this rod to the end of the jacket, as will be readily understood.

The head of the cylinder $b$ and the piston $d$ of the liquid chamber at each end of the motor slide freely on the metal jacket of the corresponding plug, suitable packing being provided to prevent leakage.

In order to provide for the requisite admission of the explosive mixture to a position between the piston $a$ and the movable cylinder $b$, valves $j$, for example, six in number, are provided in the ends of the piston $b$. And to facilitate the operation of these valves, stops $k$ have been provided in the end of the fixed casing $g$, against which the stems of the valves $j$ are adapted to abut. The stops correspond in number to the valves. Secured to each of the stops $k$ is a projecting stem $k^1$, adapted to slide in a bored opening, communicating with the chamber $c$, and serving to regulate the position of the stops $k$, in addition to the resilient means shown. In order to regulate the flow of oil in the bored opening in which the stem $k^1$ slides, a check needle $k^2$ is secured in the rear end of the fixed cylinder $g$, the end of which partially closes the end of the bored opening.

To permit the needles $k^2$, at the same end of the motor, to be simultaneously adjusted, they emerge from the liquid chamber through packing joints $k^3$, and bear against the flange of a cap $l$, concentric with the motor cylinders.

The stems of valves $j$ abut against the adjustable stops $k$, which thus control their opening. These stops comprise pistons, the rear face of each of which receives the pressure of a spring, coiled about its rod $k^1$, the movement of which is retarded by the pressure of the oil in the bored opening communicating with the cavity $c$. The passing of this oil through the orifices communicating with the chamber $c$ can be controlled by the screw cap $l$ which determines the position of the needles $k^2$. By screwing or unscrewing this cap $l$, the head of which bears upon the six needles arranged at the same end of the motor, they may all be simultaneously displaced parallel to the axis of the motor, and thereby bring about a corresponding adjustment of the orifices which control the flow of oil displaced by the stems $k^1$.

In order to provide for the admission of the explosive mixture to the fixed cylinder $g$, there is provided a conical valve $m$, having an outwardly projecting sleeve, and sliding on a portion of the fixed cylinder $g$. The outer edge of the conical valve $m$ is adapted to abut against the valve seat formed in the internal face of the fixed cylinder $g$. The conical portion of valve $m$ is provided with a plurality of radial fingers $m'$, as shown in Figures 9 and 10, which bear upon the spaces between fixed fingers $m^2$, which form the valve seat.

In order to obtain this result, the valves $m$ are operated by a liquid system of transfer, which will now be described, and which is shown in Figures 3, 4, 5, 6 and 7.

One of the moving parts, the piston $a$, for example, carries along, through the medium of a small connecting rod $n$ and a lever $n^1$, (see Figure 2) or by any other device, a piston rod $o$, which thus follows a movement synchronous with that of the moving part which drives it (see Figures 2, 3, 4, 5, 6 and 7).

This piston $o$ acts upon a liquid contained in a closed space, and acting itself upon a further piston $o^1$ which actuates the valve $m$ through the medium of a lever $p$, a forked rocker arm, or any other suitable arrangement (see Figure 2).

In the particular case shown in Figure 2, the second piston $o^1$, which operates the valve $m$, is in the form of a slide forming a differential piston, and, in the interior of which the first one, $o$ works.

The piston $o$ has two ends each provided with a spring valve $q$ and $q^1$ and the differential slide or piston $o^1$ moves itself in the interior of a fixed cylinder $r$ which has a central annular rib or projection $r^1$ past which the central opening $o^2$ of the piston $o^1$ can move.

The figures annexed hereto will make the working of this part properly understood.

In Figure 3 the movable piston $o$ and the piston $o^1$ are both at the end of the left hand stroke and the former is about to return towards the right.

The space $s$ being closed and the area of the annular section 1, 2, of the piston $o^1$ being greater than that of its annular section 3, 4, the compression of the oil in this space $s$, when the piston $o$ commences to move to the right, causes the piston $o^1$ to move in the same direction until its opening $o^2$ passes towards the right beyond the projection $r^1$ of the fixed cylinder $r$.

The movement being very rapid, the inertia of the piston $o^1$ carries it along to the end of the stroke into the position shown in Figure 4, that is to say until the finger valve $m$ connected therewith, as heretofore explained, is in contact with its seat.

At this moment, the piston $o$, continuing towards the right, forces back the oil from the space $s$ through the annular space $s^1$ and the opening $o^2$ of the slide into the chamber $t$ the increased pressure in which unseats the valve $q$ (see Figure 4) compressing the spring $q^2$ (see Figure 3) which has not been shown in the other figures in order to simplify them, and the volume expelled from the space $s$ thus passes into the space $u$.

A little before the piston $o$ arrives at the end of its stroke, the finger $v$ (see Figure 5) which is attached to it, is brought into contact with the head which carries the tail of the small valve $w$ and causes the same to be separated from its seat. The result of this is that when the piston $o$ starts off again towards the left, it does not immediately develop any appreciable pressure in the space $u$, and can only move the slide $o^1$ after the movement from the position of Figure 5 to that of Figure 6, in which the small valve $w$ falls back again on to its seat thereby, closing the chamber $u$. The valve $w$, as thus operated, provides for a desired delay in the opening of the valve $m$.

Starting from the instant the small valve $w$ is closed the space $u$ being closed, the liquid is compressed therein and as the area of the annular section 5, 6, (see Figure 3) of the piston $o^1$ is greater than that of its section 7, 8, the action of the former is preponderant and thrusts the slide $o^2$ towards the left, the effect of which is to open the valve $m$.

This movement takes place like the preceding one until the openings $o^2$ in the piston $o^1$ passes the annular projection $r^1$ on the fixed cylinder $r$ (see Figure 7).

The slide $c^1$ and the valve $m$ continue to move by inertia to the end of their stroke after which the oil displaced from the space $u$ is forced through the annular space $u^1$, unseats the valve $q^1$ and passes into the space $s$.

On movement of the piston $o$ from the Figure 5 position to that of Figure 6, the valve $q$ is closed prior to the closing of valve $w$, thereby causing a small quantity of oil to pass from the space $u$ through the last mentioned valve. To compensate for this loss provision is made whereby an equal amount of oil may be drawn into the space $s$, an automatic inlet valve, not shown in the drawings, being provided for such purpose, as a port of the general oil supply system, in which a suitable pressure may be maintained by any appropriate means.

Having regard to the shortness of time during which the stop pistons $d$ of the moving parts $a$ and $b$ force back the liquid in the force pipes, it is necessary that the automatic valves $e$ which serve for this forcing back be very specially light (see Figure 1).

To this end, they have been constituted as shown in Figures 11 and 12 by the ends $x^1$ of spring tongues $x$ as thin as the pressure utilized allows and slightly hollowed so as to better resist this pressure.

The kind of blades $x^1$ thus formed on the ends of these springs $x$, rest above holes $y$ pierced in the seat; each valve is situated at the end of a spring with several leaves held at its centre in such a way that in rising it changes its shape in a symmetrical manner.

The motor should be provided with a controller allowing of reducing the admission of the fuel when the movable parts of the motor exceed their maximum admissible strokes. This controller is automatic and is combined with a system of hand control.

To this end, one of the moving parts, the cylinder $b$ for example, carries a finger $z$ (see Figures 2 and 8) which follows it in its movement and which, at each end of its stroke, comes into contact with a small piston $a^1$.

This latter thus receives at each stroke a slight movement which is the more accentuated as the moving part exceeds the allowed limit the more.

This small piston $a^1$ working in a pump barrel $b^1$ provided with two check valves $c^1$ $c^2$, thus forces back at each stroke a quantity of liquid which is the greater the more the normal stroke is exceeded.

This liquid passing through a pipe $d^1$ (see Figure 8) passes into the interior of a second pump barrel $g^1$ where it tends to lift another piston $h^1$.

The action of the liquid is counter-balanced by a spring $j^1$ suitably tared and on the other hand by an adjustable orifice or leak constituted by a needle $l^1$ which allows the liquid to escape.

The result is that under normal regulation the liquid attains a pressure which is such that it flows away by the adjustable leak $l^1$ with a flow equal to that of the piston $a^1$ and that this pressure determines the position of the piston $b^1$ working under the elasticity which has been selected by the spring $j^1$.

The piston $h^1$ carries a rod $b^2$ the conical end of which engages in the interior of the hole $m^1$ in the fuel atomizer.

It will be understood from this that if from any cause, the motor is insufficiently loaded and the cylinder exceeds its normal stroke, it forces back a quantity of oil greater than that which can escape in the same time by the adjustable leak $l^1$ and that the excess of the supply of the liquid lifts the piston $h^1$ compressing the spring $j^1$ until this increase of pressure forces the supply from the leak to become equal to that of the piston $a^1$.

The conical rod $h^2$ of the piston $h^1$ will therefore gradually obstruct the hole in the atomizer $m^1$ and reduce the supply of fuel until the stroke of the moving parts again becomes normal and until from this fact the feed of the piston $a^1$ itself becomes normal again.

It will be apparent that the pistons $a'$ and $h'$ may be replaced by diaphragms or any other appropriate movable wall portions capable of acting upon and being affected by the combined liquid.

It is necessary that the driver of the motor may always be able to slow but in no case be able to compel the moving parts to exceed their limited position, which would bring about the breakage of the motor.

To this end, the handle or pedal for controlling the gases does not directly control the rod $h^2$ but a stop $p^1$ which passes through a tight lining into the interior of the cylinder $g^1$ and can thrust the piston $h^1$ upwards that is to say in the direction which cuts off the fuel, while in the other direction, it is the stroke regulator which alone is able to control the maximum of admission. It may be advantageous furthermore to also arrange a spring between the stop $p^1$ and the piston $h^1$ so as to render the driver's control of the motor more progressive.

Figure 8 illustrates the atomizer of one of the carbureters and the controlling mechanism therefor, the object of which is to indicate the double control of the supply of the fuel, imperative in certain cases by the motor itself, and optional in others by the driver of the motor. It is proper to note always in this matter that, in particular, this figure does not mention an additional oil atomizer which will be placed near that for the fuel employed. As a matter of fact, at the very high pressure at which the motor has to work, it is possible, without inconvenience, to mix the lubricating oil and the fuel employed; the excess of oil not utilized for lubrication will be burned at the time of auto ignition. On the other hand, the very high speed at which the motor works requires direct lubrication in the explosion chamber.

In Figure 8, the constant level $t^1$ of the carburetor and the handle $v^1$ for controlling the inlet have been simply represented for the comprehension of the explanation, but are on a much more reduced scale than the other parts of the operating mechanism.

The starting of the motor may be effected by any suitable means, for example, by means of the mechanism described in my Patent No. 1,459,019 June 19, 1923.

What I claim and desire to secure by Letters Patent of the United States is:—

1. An explosion motor, comprising a fixed cylinder, a movable cylinder in said fixed cylinder, and a movable piston slidable in said movable cylinder, the movable elements being adapted to be driven in opposite directions by the explosion of a charge between their adjacent faces, and chambers adapted to contain a compressible liquid, closed at one end by a movable diaphragm adapted to be actuated by the movable cylinder and acting as a piston compressing the fluid; the supply of said fluid under pressure from said chamber serving as the transmission medium to transmit power from the movable elements to external mechanism.

2. An explosion motor, according to claim 1, characterized by the fact that the movable diaphragm and the compressible liquid contained in the chamber serve as cushioning means for the moving elements of the device.

3. A motor, according to claim 1, characterized in that the movable piston is provided with openings to permit eventually the escape of some of the burnt gases of the explosion, each opening being closed by a safety valve comprising a counter-weighted portion and a leaf spring secured to said counter-weighted portion, the counter-weighted portion and the spring serving to maintain the valve against its valve seat, and the leaf spring being located substantially parallel to the direction of motion of the moving parts.

4. A motor, according to claim 1, characterized by the provision of a plurality of stop elements for the valves of the movable cylinder, each of said elements comprising a stem sliding in a bored opening communicating with the fluid chambers, and the valves in the ends of the movable cylinder having projecting stems adapted to strike said stops.

5. A motor, according to claim 1, characterized by the provision of a plurality of stop elements for the valves of the movable cylinder, each of said elements comprising a stem slidable in a bored opening communicating with the fluid chambers and the valves in the ends of the movable cylinder having projecting stems adapted to strike said stops, and in which said openings are closed by simultaneously operated needles.

6. In a motor according to claim 1, the combination with an admission valve, of means for actuating said valve, comprising a cavity filled with liquid, two pistons in said cavity, a connection between one of the pistons and one of the movable elements of the motor, a connection between the other piston and the valve, and means controlling the transmission of motion from one of said pistons to the other in such manner that the said valve may be operated at each reversal of the directions of movement of the elements of the motor, without any variation due to the points in the course of such movement at which the said changes of direction take place.

7. In a motor according to claim 1, the combination with an admission valve, of means for actuating said valve, comprising a cavity filled with liquid, two pistons in said cavity, a connection between one of the pistons and one of the movable elements of the motor, a connection between the other piston and the valve, means controlling the transmission of motion from one of said pistons to the other in such manner that the said valve may be operated at each reversal of the directions of movement of the elements of the motor, without any variation due to the points in the course of such movement at which the said changes of direction take place, a supplementary valve communicating with said liquid filled cavity, and means for operating said valve at alternate reversals of the motor elements whereby the opening of the admission valve is delayed.

8. The combination with an explosion motor of the character described having an operating element of variable stroke, of a fuel feed stroke regulator therefor, comprising communicating liquid chambers, each having a movable wall portion, a fuel atomizer having a needle controlled in its movement by one of said wall portions, a stem extending from the other of said wall portions, and a finger carried by said operating element adapted to engage and move said stem, thereby causing the connecting wall portion to be variably moved in accordance with the variations in the stroke of said motor.

9. The combination with a motor and fuel feed stroke regulator according to claim 8, of a stop adapted to limit the retractive movement of the wall portion which controls the movement of the fuel atomizer needle, and means for manually varying the position of said stop.

In witness whereof, I have hereunto signed my name.

ROBERT ESNAULT PELTERIE.